US007612132B2

(12) United States Patent
De Fazio et al.

(10) Patent No.: US 7,612,132 B2
(45) Date of Patent: Nov. 3, 2009

(54) REDISPERSING AGENTS FOR REDISPERSIBLE POLYMER POWDERS AND REDISPERSIBLE POLYMER POWDERS INCLUDING SAME

(75) Inventors: Valentino De Fazio, Parkville (AU); Robert Mantello, Werribee (AU)

(73) Assignee: Acquos Pty Ltd, Campbellfield, Victoria (AU)

( * ) Notice: Subject to any disclaimer, the term of this patent is extended or adjusted under 35 U.S.C. 154(b) by 277 days.

(21) Appl. No.: 10/570,219

(22) PCT Filed: Feb. 5, 2004

(86) PCT No.: PCT/AU2004/000128

§ 371 (c)(1),
(2), (4) Date: Feb. 28, 2006

(87) PCT Pub. No.: WO2005/021145

PCT Pub. Date: Mar. 10, 2005

(65) Prior Publication Data

US 2007/0010604 A1    Jan. 11, 2007

(30) Foreign Application Priority Data

Sep. 1, 2003    (AU) .............................. 2003904725

(51) Int. Cl.
*C08K 5/13*    (2006.01)
*C08K 5/41*    (2006.01)
*C07C 309/00*    (2006.01)

(52) U.S. Cl. ......................................... 524/156; 562/74
(58) Field of Classification Search ................. 524/156; 562/74

See application file for complete search history.

(56) References Cited

U.S. PATENT DOCUMENTS

| 2,205,950 | A | | 6/1940 | Flett |
| 3,883,489 | A | | 5/1975 | Matschke et al. |
| 4,457,874 | A | * | 7/1984 | Papalos et al. ................. 562/74 |
| 5,225,478 | A | | 7/1993 | Beckerle et al. |
| 5,519,084 | A | | 5/1996 | Pak-Harvey et al. |
| 5,567,750 | A | | 10/1996 | Schulze et al. |
| 5,777,003 | A | * | 7/1998 | Haas et al. ................... 523/223 |
| 6,028,167 | A | | 2/2000 | Pakusch et al. |

FOREIGN PATENT DOCUMENTS

| AU | 718907 | 7/1997 |
| DE | 2445813 | 4/1976 |
| JP | 05-209032 | 8/1993 |
| JP | 2002-053847 | 2/2002 |

OTHER PUBLICATIONS

Supplementary Search Report, Nov. 10, 2008, 3 pgs.

* cited by examiner

*Primary Examiner*—Kriellion A Sanders
(74) *Attorney, Agent, or Firm*—Kagan Binder, PLLC

(57) ABSTRACT

The invention relates to a redispersible polymer powder including a polymer to be redispersed and an ortho-cresol based condensation polymer or salt thereof and methods for manufacturing same. More particularly, the invention relates to the use of an ortho-cresol based condensation polymer as a redispersing aid in a redispersible polymer powder.

26 Claims, No Drawings

REDISPERSING AGENTS FOR REDISPERSIBLE POLYMER POWDERS AND REDISPERSIBLE POLYMER POWDERS INCLUDING SAME

The present invention relates to redispersing aids for use in the manufacture of redispersible polymer powders and processes for making same. In particular, the invention relates to the use of ortho-cresol based condensation polymers, for example, ortho-cresol sulfonic acid formaldehyde condensates, and their salts as redispersing aids in redispersible polymer powder systems. The invention further relates to redispersible polymer powders that include such a redispersing aid and compositions or systems including such redispersible polymer powders.

The use of redispersible film forming polymers in powder form finds widespread use throughout a number of industries. For example, such redispersible film forming polymers are used as construction binders for tile adhesives, synthetic resin plasters, floor leveling mixes and in areas where a waterless system is generally desirable. These systems in general are produced by the dry blending of the raw materials, such as sand, cement, calcium carbonate, silica flour, modified cellulose based thickeners, and the dry polymer powder, to obtain a ready to use finished product for site mixing where water is added at the point of use. These systems are advantageous as they avoid the need for a two component system, one component containing an aqueous polymer dispersion and the other component containing the powder component which may contain a hydraulic setting component such as cement. Avoiding such systems may be advantageous for a number of reasons such as economy, utility and environmental considerations.

To obtain a film forming polymer in powder form, a liquid dispersion of the polymer is subjected to a drying operation where the water is removed by a suitable method such as spray drying or freeze drying. Spray drying is a widely used and understood method that gives a fine powder which, under well controlled predetermined conditions, does not have to be further processed. This method is therefore generally preferred.

In order to manufacture a redispersible film forming polymer powder with glass transitions below 50° C., it is generally necessary to add to the liquid dispersion before spray drying a quantity of redispersing aid. Redispersing aids act to coat the individual polymer particles to prevent irreversible primary particle formation. Such aids also advantageously increase the yield during the spray drying process by minimizing sticking of the dried polymer to the walls of the spray dryer. The redispersing aid may also improve the storage stability of the polymer powder by minimizing "blocking" (the thermoplastic fusion of the polymer particles under weight pressure), and should generally have some hydrophilic properties to aid redispersability of the polymer powder on the reintroduction of water.

The redispersible polymer powders known to date generally comprise a redispersing aid that is water soluble and which is generally added to the polymer dispersion before spray drying. As stated above, this advantageously prevents or reduces the formation of primary particles during the spray drying operation.

Polyvinyl alcohols have historically been used as redispersing aids for ethylene vinyl acetate (EVA) dispersions for many years. For example, U.S. Pat. No. 3,883,489 assigned to Hoechst Aktinengellschaft makes use of polyvinyl alcohol as a redispersing aid for ethylene vinyl acetate dispersions. Whilst not as effective, polyvinyl alcohols can also be used as redispersing aids in the manufacture of redispersible acrylic or styrene-acrylic polymer powders. For example, U.S. Pat. No. 5,567,750 assigned to Wacker-Chemie GmbH makes use of a polyvinyl alcohol along with an amino functional polyvinyl alcohol for the manufacture of a redispersible styrene-acrylic polymer powder. U.S. Pat. No. 5,519,084 assigned to Air Products and Chemicals makes use of a polyvinyl alcohol as a redispersing aid with an acrylic polymer consisting of up to 15% olefinically unsaturated carboxylic acid. However, polyvinyl alcohols are not entirely satisfactory as redispersing aids for acrylics or styrene acrylics or styrene butadiene dispersions as they are for ethylene vinyl acetate dispersions.

The use of salts of arylsulfonic acid-formaldehyde condensates as redispersing aids is also known, especially for acrylic dispersions. German Offenlegungsschrift 24 45 813 translated as "Redispersible synthetic powder and method of production" describes the use of phenol sulfonic acid formaldehyde condensates and naphthalene sulfonic acid formaldehyde condensates and their alkali salts or their alkali earth metal salts as redispersing aids for redispersible powders. U.S. Pat. No. 5,225,478 assigned to BASF also describes the use of phenol sulfonic acid formaldehyde condensates and their alkali salts or alkali earth metal salts as a redispersing aid. U.S. Pat. No. 6,028,167 assigned to BASF describes an improvement by controlling the molecular weight of the redispersing aids. Likewise, Australian Patent No. 718,907 describes an improvement in naphthalene sulfonic acid formaldehyde condensates by controlling or restricting the molecular weight of the redispersing aids.

The issue of molecular weight control is generally considered important in the manufacture of redispersing aids for redispersible powders. For example, U.S. Pat. No. 6,028,167 describes in example S1 the method of manufacture for a phenol sulfonic acid formaldehyde condensate with a molecular weight of 750. Example S1 was repeated (as Example S2) with the only change being the increased condensation time and hence molecular weight. Example S2 was not as effective as Example S1 as a redispersing aid. During the manufacturing on an industrial scale, therefore, molecular weight control is an important parameter. Furthermore, there is always a residual amount of high molecular weight (>10,000) components remaining after reaction (Table 1 in same patent-inventive example) This portion of the redispersing aid will not be as effective as the lower molecular weight species that are required for redispersing the polymer powder.

The present invention aims to provide an alternative redispersing aid for use in the manufacture of redispersible polymer powders. Particularly, a redispersing aid that is suitable for use in systems involving a polymer having a relatively low glass transition temperature. More particularly, the invention relates to the manufacture of an ortho-cresol sulfonic acid formaldehyde condensate based dimer or oligomer and its salts, and the use of such products as a redispersing aid. The invention advantageously further provides an industrial process that will make the manufacture of such redispersing aids more reproducible in terms of molecular weight.

According to one aspect of the present invention there is provided a redispersible polymer powder including:

a polymer to be redispersed; and an ortho-cresol based condensation polymer or salt thereof.

According to another aspect of the invention there is provided a method for manufacturing a redispersible polymer powder including:

forming a dispersion of a polymer to be redispersed and an ortho-cresol based condensation polymer; and drying the dispersion to form the redispersible polymer powder.

There is also provided a polymer powder manufactured by the method of the immediately preceding paragraph.

According to a further aspect the invention provides the use of an ortho-cresol based condensation polymer as a redispersing aid in a redispersible polymer powder.

There is also provided a product including, as a binder, the redispersible polymer powder discussed in accordance with this invention. There is still further provided the use of such a redispersible polymer powder as a binder for a product, such as for example hydraulically setting compositions, adhesives, coating compositions, synthetic resin renders, and for modifying building materials.

As used herein, the term "ortho-cresol based condensation polymer" primarily includes ortho-cresol sulfonic acid formaldehyde condensation polymers and (ortho-cresol/phenol) sulfonic acid formaldehyde condensation polymers, but may also include within its ambit mixed condensation polymers of ortho-cresol sulfonic acid with other monomers suitable for such condensation reaction, more specifically their sulfonated product.

Ortho-cresol is an important starting material for the redispersing aid of the invention and pivotal for the various applications of the redispersing aid of the invention. While not wanting to be bound by any theory as to why the products of this invention are effective, the following serves as a guide that is not intended to limit the scope of the invention in any way, but which serves as information as to the most likely synthesis products of the invention.

The ortho-cresol based condensation polymer or salt thereof is, in one embodiment, an ortho-cresol sulfonic acid formaldehyde condensation polymer which may be manufactured by a method comprising:

(i) sulfonating ortho-cresol with sulfuric acid preferably under a slight excess of sulfuric acid;

(ii) condensing the sulfonated ortho-cresol with formaldehyde.

The first step of this embodiment of the invention involves the sulfonation of ortho-cresol with sulfuric acid under slightly greater than equimolar concentration (i.e. slight excess of sulfuric acid). Sulfonation of ortho-cresol is generally an ortho/para reaction relative to the hydroxyl group. However, sulfonation normally proceeds in the para position relative to the hydroxyl group due to reasons such as steric hindrance, as opposed to the only ortho position that is available. This first step would predominantly form ortho-cresol sulfonic acid with the sulfonic group in the para position to the hydroxyl radical. The addition of the sulfuric acid preferably takes place at from 35 to 60° C. with the final sulfonation preferably taking place at higher temperatures (such as from 85 to 95° C.). The second step involves the condensation of the sulfonated ortho-cresol with formaldehyde. As condensation is predominantly ortho/para, the condensation will only take place at the remaining ortho position. The predominant product manufactured is a dimer of two ortho-cresol sulfonic acid molecules.

According to an alternative embodiment the ortho-cresol based condensation polymer or salt thereof is an ortho-cresol sulfonic acid mixed condensation polymer which may be manufactured by a method comprising:

(i) sulfonating ortho-cresol with sufuric acid preferably under a slight excess of sulfuric acid;

(ii) condensing the sulfonated ortho-cresol with a compatible monomer.

In this embodiment, the ortho-cresol sulfonic acid is used as a molecular weight regulator for the production of mixed condensation polymers with monomers such as cresol (mixed isomers), phenol, resorcinol, naphthalene, meta-cresol, para-cresol as well as their respective sulfonated acids. Whilst other combinations of oligomers will be present in the resultant reactant products, the products are generally low molecular weight species that are effective and are within the molecular weight range that is preferred for a redispersing aid for redispersible polymer powders. More importantly, high molecular weight species are significantly reduced or eliminated using the above mentioned steps. It is thought that this is true so long as the sulfonation of the ortho-cresol is complete in the first step (to reduce the reactive sites for condensation to only one remaining ortho position), and a significant amount of ortho-cresol is used to regulate the molecular weight of the final product. The final product may be neutralized prior to use with a base.

There are two preferred aspects to the manufacture of the ortho-cresol based condensation polymer or salt thereof in accordance with the invention. The first includes the use of ortho-cresol to form an ortho-cresol sulfonic acid formaldehyde condensation polymer and its salts as discussed above. The second preferred aspect is the use of ortho-cresol and phenol mixed, or ortho-cresol sulfonic acid and phenol sulfonic acid mixed as starting materials, to form an ortho-cresol/phenol-sulfonic acid formaldehyde condensation polymer or its salts. The ortho-cresol may be mixed with phenol before sulfonation or the ortho-cresol sulfonic acid may be mixed with the phenol sulfonic acid prior to condensation. Other process modifications will be apparent to those skilled in the art, such modifications being included within the spirit of the present invention.

The ortho-cresol based condensation polymer or salt thereof, preferably ortho-cresol sulfonic acid formaldehyde condensate, is generally used in its form of its salts. The salts will generally include the alkali metal salts or the alkaline earth metal salts. Ammonium salts or organic amines may also be used. Preferred salts are the calcium salts or the sodium salts or combination of these.

The present invention also provides for the use of ortho-cresol based condensation polymers or salts thereof, particularly ortho-cresol sulfonic acid formaldehyde condensate and its salts, as a redispersing aid in the preparation of redispersible polymer powders. Preferably the ortho-cresol based condensation polymer or salt thereof is added at a level of from about 1% to about 30% by weight of solid ortho-cresol based condensation polymer or salt thereof relative to the solid polymer powder, more preferably from about 1% to about 15%. This illustrates an advantage of the inventive powders over the products of the prior art which generally require larger amounts of redispersing aid based on the weight of the polymer.

The polymers that may be used in combination with the ortho-cresol based condensation polymer or salt thereof are generally those with glass transitions below 50° C. Most preferred are flexible polymers which generally have a glass transition below 5° C. For example, polymers manufactured using emulsion polymerisation techniques. Polymers may be pure acrylic polymers (example based on methylmethacrylate and alkyl acrylates such as butyl acrylate), styrene-acrylic (example based on styrene and alkyl acrylates such as 2-ethylhexyl-acrylate), vinyl acetate copolymers with alkyl acrylate or ethylene or maleates, and styrene-butadiene based polymers. More particularly, the polymer may preferably contain two or more monomers selected from the group consisting of styrene, methylmethacrylate, vinyl acetate, butadiene, n-butyl acrylate, 2-ethylhexylacrylate, ethylacrylate, methylacrylate, ispropylacrylate, vinyl propionate, dibutyl maleate, ethylene, tert-butyl acrylate, methacrylic acid, acrylic acid, acrylamide, methacrylamide, hydroxyethyl methacrylate.

The type of polymer to be used within this invention, however, is not restricted on the combination referred to above, but most polymers used in industry, used in the manufacture of construction products, and used as an anionic or nonionic dispersion polymer in water, will generally be able to be used with the ortho-cresol based condensation polymer or salt thereof so long as the two components are compatible when mixed in liquid form before drying, particularly spray drying. Examples of these types of polymers are generally those referred to in the description in Australian Patent No. 717,206 which is incorporated herein in its entirety by reference thereto. The type of polymer is not critical for the use of the invention.

The ortho-cresol based condensation polymer or salt thereof is generally mixed with the polymer dispersion before drying. The resultant mixture is then preferably spray dried using conventional spray drying techniques. For example, rotating disc atomization, single fluid nozzles or multi fluid nozzles are used for the atomization step along with a drying operation in a chamber preferably using air heated from 120 to 180° C. The resultant polymer powder is preferably collected in cyclones or filter bag houses. Anti-caking agents may also be metered in whilst the polymer powder is suspended in the air stream.

Embodiments of the invention will now be discussed in more detail with reference to the following examples which are provided for exemplification only and which should not be considered limiting on the scope of the invention in any way.

EXAMPLES

Preparative Example D1

A glass 1 liter laboratory reactor equipped with 2 dosing lines, a variable speed mechanical stirrer, a reflux condenser, a glass thermometer, and a water bath was loaded with 77 grams of deionised water, 0.8 grams of sodium bicarbonate, 0.5 grams of a nonyl phenol ethoxylate with 30 moles of ethylene oxide, 0.35 grams of a solid sodium salt of a sulfated nonyl phenol ethoxylate with 30 moles of ethylene oxide. To the above was added 17 grams from a feed mix 1 comprising 78 grams of water, 2 grams of a nonyl phenol ethoxylate with 30 moles of ethylene oxide, 0.7 grams of a solid sodium salt of a sulfated nonyl phenol ethoxylate with 30 moles of ethylene oxide, 5 grams of acrylamide, 144 grams of butyl acrylate, and 96 grams of styrene and was heated to 85 degrees celcius. Once the temperature had reached 85 degrees, 2 grams of a mix number 2 was added which comprised of 22 grams of water with 1.6 grams of sodium persulfate. The reactor loading was allowed to react for 10 minutes. The remaining of mixture 1 was then fed over 2 hours whilst the remaining mixture 2 was fed over 2 hours and 10 minutes. The contents of the reactor flask was held at 85 degrees by controlling the temperature of the water bath. The agitator speed was around 400 rpm. At the end of the feeds, the reaction product was held for 30 minutes at 85 degrees. 0.5 grams of TBHP (70% solution) was then added in 2 grams of water and the reaction product was allowed to cool to room temperature. A mixture comprising 2 grams of ammonia in 2 grams of water was then added to bring the pH above 7. The product was filtered through a 200 micron screen and gave a polymer dispersion with a solids content of 57% with an onset glass transition (as measured with a Shimadzu DSC-60 differential scanning colorimeter) of −3 degrees Celsius.

Example 1

A glass 3 liter laboratory reactor equipped with 1 dosing line, a variable speed mechanical stirrer, a reflux condenser and a water bath was loaded with 350 grams of ortho-cresol and heated to 60 degrees Celsius. At 60 degrees, 390 grams of sulfuric acid (98%) was added over 40 minutes and the temperature of contents was then heated at 85-95 degrees Celsius for 75 minutes. The contents of the reactor were there again cooled to 60 degrees and 600 grams of water was added. A mixture comprising 180 grams of formaldehyde (30% in water) and 800 grams of water was then dosed into the reactor over 30 minutes and the contents were then heated at 85-95 degrees for 2.5 hours. The contents of the reactor was then cooled to room temperature and added to a solution of Calcium hydroxide (280 grams) and water (1600 grams) and filtered. The resultant mixture had a pH of 8.3 and a solids content of 22.5%. The resultant mixture was foamy on neutralization with the base and clearly demonstrated surfactant type properties.

Example 2

The procedure of example 1 was repeated but the 350 grams of ortho-cresol was replaced with 175 grams of ortho-cresol and 153 grams of phenol and the calcium hydroxide was increased to 300 grams. The resultant mixture had a pH of 8.7 and a solids content of 22.8%. The resultant mixture was less foamy on neutralization with the base as compared to example 1, but still clearly demonstrated surfactant type properties.

Example 3

Example 1 was repeated but the condensation time was increased from 75 minutes to 7 hours. The product was slightly darker than example 1 however, all other properties were similar (foamy on neutralization and pH of 8.4)

Comparative Example 1

Example 3 was repeated but the ortho-cresol was totally replaced with phenol. The product was similar in colour to example 1 but was not as foamy on neutralization clearly demonstrating lower surfactant type properties and the likelihood of higher molecular weight species.

Example 4

The procedure in example 1 was repeated but the product was neutralized with 505 grams of Sodium hydroxide (46% in water) instead of the calcium hydroxide and water mix.

Comparative Example 2

Lomar D (a commercial high molecular weight sodium salt naphthalene sulfonate formaldehyde condensation product available from Cogins) was made into a 25% solution in water. The product was non foaming and very dark.

Example Powder P1

A mixture comprising 500 grams of water, 190 grams of example 1, 1000 grams of example D1 and 5 grams of defoamer (Foamaster 8034e) and 3 grams of Sodium Hydroxide (46% in water) was mixed and spray dried in a "Niro production minor" spray drier as manufactured by Niro Denmark refitted with a "Nubilosa" nozzle as manufactured by Nubilosa Germany. The inlet temperature was 130 degrees Celsius, and the air outlet was set to 50% maximum. Fine talc was metered into the air stream at 2-3% based on solid polymer. The product was collected and the redispersabilty was evaluated when mixed with water and also when mixed with sand, cement and water as a mixture. The product was very redispersible.

Example Powder P2

Example powder P2 was prepared as per example powder P1 with redispersability aid example 2. The product obtained was very readily redispersible with similar results as example powder P1.

Example Powder P3

Example powder P3 was prepared as per example powder P1 with redispersability aid example 3. The product obtained was slightly darker than example powder P1, however the redispersabilty was still the same as example powder P1. This example shows that the reaction time of the redispersing aid is not influenced by the reaction time (condensation time) as prior art examples (as they are in examples in U.S. Pat. No. 6,028,167) and demonstrates a more consistent product that is not overly dependent on process conditions.

Comparative Example Powder CP1

Example powder CP1 was prepared as per example powder P1 with redispersability aid comparative example 1. The product obtained was slightly less redispersible than example powder P1.

Example Powder P4

Example powder P4 was prepared as per example powder P1 with redispersability aid example 4. The product obtained was very readily redispersible (more so than example powder P1) and was very hygroscopic.

Comparative Example Powder CP2

Example powder CP2 was prepared as per example powder P1 with redispersability aid comparative example 2. The product obtained was not redispersible due to the very high molecular weight of this condensation product.

The reference to any prior art in this specification is not, and should not be taken as, an acknowledgment or any form of suggestion that that prior art forms part of the common general knowledge in Australia.

The invention has been described by way of non-limiting example only and many modifications and variations may be made thereto without departing from the spirit and scope of the invention described.

The invention claimed is:

1. A redispersible polymer powder including:
    a polymer to be redispersed; and
    an ortho-cresol based condensation product or salt thereof.

2. A redispersible polymer powder according to claim 1, wherein the ortho-cresol based condensation product or salt thereof is an ortho-cresol sulfonic acid formaldehyde condensation product manufactured by a method comprising:
    (i) sulfonating ortho-cresol with sulfuric acid; and
    (ii) condensing the sulfonated ortho-cresol with formaldehyde.

3. A redispersible polymer powder according to claim 2, wherein the sulfonation step (i) is carried out under a slight excess of sulfuric acid.

4. A redispersible polymer powder according to claim 2, wherein the addition of the sulfuric acid to the ortho-cresol takes place at from 35 to 60° C. and the final sulfonation takes place at higher temperatures from 85 to 95° C.

5. A redispersible polymer powder according to claim 1, wherein the ortho-cresol based condensation product or salt thereof is an ortho-cresol sulfonic acid mixed condensation product manufactured by a method comprising:
    (i) sulfonating ortho-cresol with sulfuric acid; and
    (ii) condensing the sulfonated ortho-cresol with a compatible monomer.

6. A redispersible polymer powder according to claim 5, wherein the sulfonation step (i) is carried out under a slight excess of sulfuric acid.

7. A redispersible polymer powder according to claim 5, wherein the compatible monomer is selected from cresol, phenol, resorcinol, naphthalene, meta-cresol, para-cresol and their respective sulfonated acids.

8. A redispersible polymer powder according to claim 7, wherein the compatible monomer is phenol.

9. A redispersible polymer powder according to claim 1, wherein the ortho-cresol based condensation product or salt thereof is an alkali metal salt or the alkaline earth metal salt.

10. A redispersible polymer powder according to claim 9, wherein the ortho-cresol based condensation product is a calcium salt or sodium salt or combination thereof.

11. A redispersible polymer powder according to claim 1, wherein the ortho-cresol based condensation product or salt thereof is added at a level of from about 1% to about 30% by weight of solid ortho-cresol based condensation product or salt thereof relative to the solid polymer powder.

12. A redispersible polymer powder according to claim 11, wherein the ortho-cresol based condensation product or salt thereof is added at a level of from about 1% to about 15%.

13. A redispersible polymer powder according to claim 1, wherein the polymer to be redispersed has a glass transition below 50° C.

14. A redispersible polymer powder according to claim 13, wherein the polymer to be redispersed includes at least one flexible polymer having a glass transition below 5° C.

15. A redispersible polymer powder according to claim 1, wherein the polymer to be redispersed is selected from pure acrylic polymers, styrene-acrylic polymers, vinyl acetate copolymers with alkyl acrylate or ethylene or maleates, styrene-butadiene based polymers and combinations thereof.

16. A redispersible polymer powder according to claim 15, wherein the polymer to be redispersed includes two or more monomers selected from the group consisting of styrene, methylmethacrylate, vinyl acetate, butadiene, n-butyl acrylate, 2-ethylhexylacrylate, ethylacrylate, methylacrylate, isopropylacrylate, vinyl propionate, dibutyl maleate, ethylene, tert-butyl acrylate, methacrylic acid, acrylic acid, acrylamide, methacrylamide, and hydroxyethyl methacrylate.

17. A redispersible polymer powder according to claim 1, wherein the ortho-cresol based condensation product or salt thereof is mixed with a dispersion of the polymer to be redispersed before drying thereof and the resultant mixture is then spray dried using conventional spray drying techniques.

18. A method for manufacturing a redispersible polymer powder including:

forming a dispersion of a polymer to be redispersed and an ortho-cresol based condensation product; and drying the dispersion to form the redispersible polymer powder.

19. A method for manufacturing a redispersible polymer powder according to claim 18, wherein the dispersion of polymer to be redispersed and an ortho-cresol based condensation product or salt thereof is spray dried to form said redispersible polymer powder.

20. A method for manufacturing a redispersible polymer powder according to claim 19, wherein the dispersion is atomized using rotating disc atomization, single fluid nozzles or multi fluid nozzles and dried in a chamber using air heated from 120 to 180° C., and wherein the resultant redispersible polymer powder is collected in cyclones or filter bag houses.

21. A method for manufacturing a redispersible polymer powder according to claim 18, wherein an anti-caking agent is metered into the polymer powder while the polymer powder is suspended in the air stream.

22. A redispersible polymer powder manufactured by the method of claim 18.

23. A product including, as a binder, the redispersible polymer powder according to claim 1.

24. A product according to claim 23, said product being selected from hydraulically setting compositions, adhesives, coating compositions, synthetic resin renders, and modified building materials.

25. A method of manufacture of a product comprising a binder, said method comprising the step of incorporating a redispersible polymer powder according to claim 1 as a binder in the product.

26. The method according to claim 25, wherein the product is selected from hydraulically setting compositions, adhesives, coating compositions, synthetic resin renders, and modified building materials.

* * * * *